2,796,077
POULTRY WATERING CUP
Reed S. Kofford, Van Nuys, Calif.

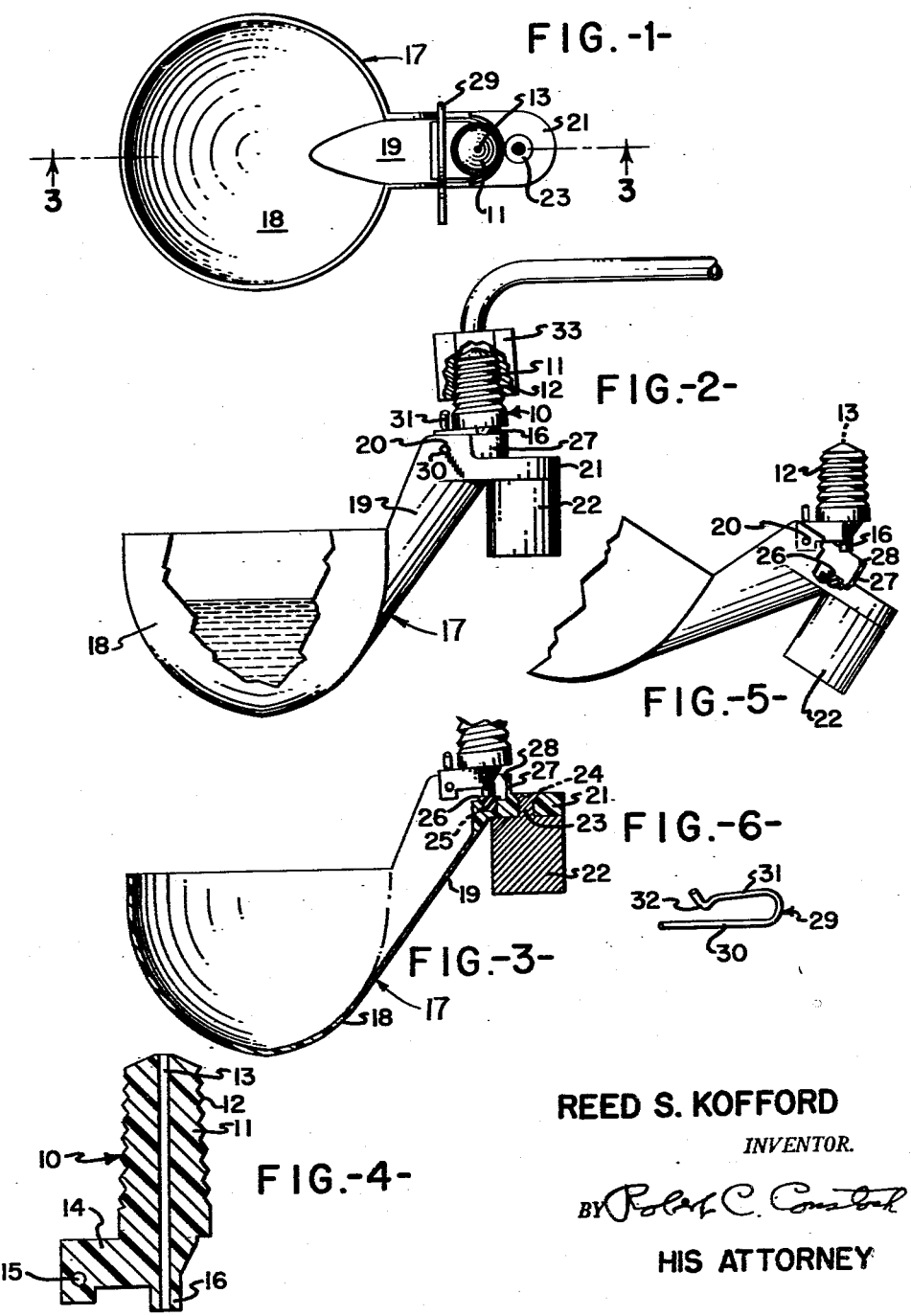

Application August 19, 1955, Serial No. 529,534

5 Claims. (Cl. 137—408)

This invention relates to a poultry watering cup and particularly to such a cup which is self-filling, being of the type in which water in the cup is balanced against a counter-weight so that a water supply valve is opened as the cup becomes partially empty and closed when the cup is filled to the desired level.

It is an object of my invention to provide such a cup which possesses advantages over those now in use, one advantage in particular being the avoidance of clogging of the water supply to the cup. Since the amount of water held in the cup is small, the water inlet is likewise small in diameter. In the past, such inlets have customarily been formed of metal, which becomes corroded or to which mineral or other deposits adhere over a period of time. Since the inlet is small in size, it does not take a large amount of deposits or other interference to cause serious clogging which partially or entirely blocks the water flow to the cup. In previous constructions it has also been difficult or impossible to gain access to the water inlet in order to clean it and return it to its original size and condition.

It is an object of my invention to overcome these difficulties by providing a water inlet which is formed entirely of plastic material such as nylon. The water inlet will thus not corrode and mineral deposits will not readily adhere to it, so that the water inlet will remain clean and clear for a far greater length of time than with previous devices.

My cup is also capable of being moved without disassembly of any parts whatsoever in order to provide access to the water inlet. In this way, even if the inlet should become blocked or clogged, it can be quickly and easily cleaned.

It is a further object of my invention to provide such a device in which the water holding portion of the cup is formed of a single piece of molded plastic such as nylon. The material used is preferably somewhat resilient, so that breakage is substantially impossible. The resistance of the plastic material to deterioration and to adherence of foreign material is equally advantageous in the case of the water holding portion as in the water inlet.

Another object of my invention is to provide a water inlet element which also acts as a fulcrum for the pivotal mounting of the water holding portion and counter-weight. It is a further object of my invention to provide an improved and simplified means of effecting such pivotal mounting comprising an easily insertable and removable pin clip.

It is also among the objects of my invention to provide such a device which is foolproof in the sense that the water will at all times flow into the water holding portion regardless of whether the cup is empty or full.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings,

Fig. 1 is a top plan view of my complete poultry watering cup;

Fig. 2 is a side view of the same in use in full position, with parts broken away to show the inside structure;

Fig. 3 is a side view of my cup in full position, partly in section taken at line 3—3 of Fig. 1;

Fig. 4 is an enlarged sectional view of the water inlet member;

Fig. 5 is a partial side view of my device in empty position, partially broken away to show how water flows into the water holding portion even when the cup is empty;

Fig. 6 is a side view of the pivot pin clip.

A preferred embodiment which has been selected to illustrate my invention comprises a water inlet member 10, which preferably comprises a single piece of suitable molded plastic, such as nylon. Water inlet member 10 includes a connector 11 which is cylindrical in contour and which is provided with external screw threading 12. A narrow water flow tube 13 extends through the longitudinal axis of connector 11.

A pivot flange 14 is formed integrally with connector 11 and extends outwardly substantially at a right angle with respect thereto. A pivot opening 15 extends through pivot flange 14 adjacent the end thereof, transversely to water flow tube 13.

The bottom of connector 11 is provided with a funnel shaped spout 16, which is formed integrally with water inlet 10 and through which water flow tube 13 extends. The bottom of spout 16 is substantially flat and is circular in contour.

A cup member 17 is likewise preferably formed of a single piece of suitable molded plastic material, such as nylon. The cup member 17 includes a hollow water holding portion 18 having an open top from which the poultry can drink. The walls of water holding portion 18 are preferably sufficiently thin so as to be somewhat flexible. This permits a considerable amount of abuse of this portion of my device without danger of breakage.

Extending upwardly from water holding portion 18 at an angle with respect thereto is a channel 19, which is formed as an integral part of cup member 17. Channel 19 is U-shaped in cross-section, having an open top with oppositely disposed side walls joined by a rounded bottom portion. A pair of aligned pivot openings 20 extend transversely through the side wall of channel 19 adjacent the top thereof.

Extending outwardly from the top of channel 19 in a direction parallel but opposite to water holding portion 18 is a counter-weight portion 21. Counter-weight portion 21 is preferably formed integrally with cup member 17 and has straight sides and a rounded end. A counter-weight 22, which is preferably formed of lead, is cylindrical in contour and has a small integral neck 23 extending upwardly from the top thereof. A counter-weight receiving opening 24 extends through counter-weight portion 21 and is slightly larger in diameter than neck 23. The top of opening 24 is flared outwardly.

The counter-weight 22 is attached to counter-weight portion 21 from beneath by inserting neck 23 into opening 24. A pointed instrument is then placed at the top of neck 23 and struck, causing the comparatively soft material forming neck 23 to flare outwardly into the flared top portion of opening 24. This prevents the neck 23 from passing back through opening 24 and attaches counter-weight 22 to counter-weight portion 21.

Part of the counter-weight portion 21 extends into the channel 19 and is provided with a cylindrical recess 25. Mounted in recess 25 is a resilient valve seat 26 having a cylindrical body portion and a flat top, the body portion fitting within recess 25 and the top being positioned thereabove.

A semi-circular rear wall 27 is formed integrally with cup member 17 and extends upwardly at a right angle from counter-weight portion 21. The top of rear wall 27 is thicker than the remainder thereof, providing an angular portion 28 adjacent the top of rear wall 27.

A pivot pin 29 is used to pivotally attach the two component parts of my cup to each other. The pivot pin 29 is substantially U-shaped, having a straight bottom leg 30 and a substantially parallel top leg 31 having a hook 32 adjacent the end thereof. In assembling my device, the bottom leg 30 is passed through openings 20 in channel 19 and pivot opening 15 in water inlet member 10. The top leg 31 passes over the top of pivot flange 14, with the bottom of leg 32 bearing thereagainst. The legs 30 and 31 of pivot pin 29 are stretched slightly apart, so that a resilient effect is obtained, with pivot pin 29 acting as a spring clip which tends to retain itself in position.

In use, the connector 11 is screw threadedly attached to a suitable water pipe 33. Before the water is turned on, my cup suspends itself in the manner shown in Fig. 5 of the drawings. When the water is turned on, it flows downwardly through water flow tube 13 and out of the bottom of spout 16. From spout 16 it falls against the lower portion of rear wall 27 and the top of counter-weight portion 21 and from there flows downwardly along channel 19 into water holding portion 18. The angular portion 28 adjacent the top edge of rear wall 27 prevents the water from flowing in the wrong direction out from the top of rear wall 27.

As the water holding portion 18 becomes full of water, its weight increases. This results in downward movement of the water holding portion 18, since it is disposed on the opposite side of pivot pin 29 from the counter-weight 22. The pivot pin 29 acts as a fulcrum, with the weight of the water in water holding portion 18 being balanced against the counterweight 22.

As water holding portion 18 fills, it moves toward a more horizontal position, finally reaching the position shown in Figs. 2 and 3 of the drawings. At this time, the bottom of the spout 16 is brought into contact with the top of valve seat 26, which acts to seal off the bottom of water flow tube 13 to prevent further water from flowing into channel 19 or water holding portion 18. This seal is maintained until sufficient water is removed from water holding portion 18 so that the counter-weight 22 lowers its end to separate the bottom of spout 16 from valve seat 26 and permit further water flow. In actual practice, a delicate balance is maintained so that substantially the same amount of water is present in water holding portion 18 at all times.

Referring to Figs. 3 and 5 of the drawings, it will be seen that the cup member 17 is freely pivotable around the bottom leg 30 of the pivot pin 29. If desired, the cup member 17 can be pivoted to an even more vertical position than that shown in Fig. 5 to permit direct access to the bottom of the water flow tube 13 for cleaning the same by passing a wire upwardly through the water flow tube 13. This can be accomplished without unscrewing the connector 11 from its socket and without removing the cup member 17. Such movement also facilitates replacing the valve seat 26 and cleaning the cup member 17.

I claim:

1. An automatically self-filling poultry watering device comprising a substantially cylindrical water inlet member formed of a single piece of non-corrosive molded plastic material, said water inlet member having integral screw threading formed on the outside thereof, said water inlet member having a water flow tube extending longitudinally therethrough, said water inlet member having an integral pivot flange extending outwardly from the lower portion thereof, said water flow tube having an unshielded necked-down bottom outlet disposed beneath said pivot flange, a cup member formed of a single piece of non-corrosive molded plastic material, said cup member having a substantially hemispherical open water holding portion at one end thereof, the walls of said water holding portion being substantially flexible, said cup member having an integral channel connected at its lower end to said water holding portion and extending upwardly for a substantial distance at an angle therefrom, said cup member having an integral counter-weight portion at the end thereof opposite from said water holding portion, a counter-weight carried by said counter-weight portion, pivot means connecting the top of said channel to said pivot flange between said water holding portion and counter-weight portion to pivotally attach said cup member to said water inlet member, said pivot means permitting pivoting of said cup member until the rim of said water holding portion lies substantially in a vertical plane, the bottom outlet of said water flow tube normally being disposed within the top of said channel, a resilient valve seat carried by said cup member and disposed within said channel directly beneath the bottom outlet of said water flow tube, said valve seat adapted to seal off the bottom of said water flow tube when pivoted thereagainst by the weight of water in said water holding portion, and a rear wall provided at the upper end of said channel on the opposite side of said bottom outlet from said water holding portion, the top edge of said rear wall being disposed clear of the axis of said bottom outlet when the rim of said water holding portion is in said vertical plane, thereby permitting cleaning of said bottom outlet without removal of said cup and without adjustment of said pivot means.

2. An automatically self-filling poultry watering device comprising a water inlet member formed of a single piece of non-corrosive molded plastic material, said water inlet member having integral screw threading formed on the outside thereof, said water inlet member having a water flow tube extending therethrough, said water inlet member having an integral pivot flange extending outwardly therefrom, a cup member formed of non-corrosive molded plastic material, said cup member having an open water holding portion at one end thereof, the walls of said water holding portion being substantially flexible, said cup member having an integral channel connected at one end of said water holding portion and extending upwardly at an angle therefrom, said cup member carrying a counter-weight at the end thereof opposite from said water holding portion, pivot means attaching the portion of said cup member between said water holding portion and counter-weight to said pivot flange, said pivot means being spaced from said water flow tube a sufficient distance to permit said cup member to be pivoted to expose the bottom of said water flow tube, the bottom of said water flow tube normally being disposed within the top of said channel, and a resilient valve seat carried by said cup member and disposed within the top of said channel directly beneath the outlet of said water flow tube, said valve seat adapted to seal off the bottom of said water flow tube when pivoted thereagainst by the weight of water in said water holding portion.

3. An automatically self-filling poultry watering device comprising a water inlet member adapted to be connected to a source of water supply, said water inlet member having a water flow tube extending therethrough, a cup member having an open water holding portion at one end thereof, a counter-weight carried by the opposite end of said cup member, pivot means connecting the portion of said cup member between said water holding portion and said counter-weight to said water inlet member, the bottom of said water flow tube normally being disposed so that water flows therefrom into said water holding portion, said cup member being adapted to seal off the bottom of said water flow tube when pivoted thereagainst by the weight of water in said water holding portion, said pivot means being sufficiently offset from said water flow tube to permit said cup member to be pivoted to expose the bottom of said water flow tube.

4. The subject matter of claim 2, said pivot means comprising a substantially U-shaped pin clip having a straight bottom leg and a substantially parallel top leg, said top leg having a downwardly directed hook therein, said bottom leg extending through aligned openings in said cup member and pivot flange, the downwardly directed portion of said top leg bearing against the top of said pivot flange to retain said pin clip in position.

5. An automatically self-filling poultry watering device comprising a water inlet member adapted to be connected to a source of water supply, said water inlet member having a water flow tube extending therethrough, said water inlet member having a pivot flange offset from said water flow tube, a cup member having an open water holding portion at one end thereof, a counter-weight disposed adjacent the opposite end of said cup member, pivot means connecting the portion of said cup member between said water holding portion and said counter-weight to said offset pivot flange, so that water will flow from said water flow tube into said water holding portion, and a valve seat carried by said cup member and disposed directly beneath the outlet of said water flow tube, said valve seat adapted to seal off the bottom of said water flow tube when pivoted thereagainst by the weight of water in said water holding portion, said pivot means being offset from said water flow tube so that a cleaning device may be inserted into said outlet of said water flow tube upon pivoting of said cup member to an extreme upper position.

References Cited in the file of this patent

UNITED STATES PATENTS

| | | |
|---|---|---|
| 2,616,444 | Norland | Nov. 4, 1952 |
| 2,714,391 | Goff | Aug. 2, 1955 |